US009256803B2

(12) United States Patent
Price et al.

(10) Patent No.: US 9,256,803 B2
(45) Date of Patent: Feb. 9, 2016

(54) AUTOMATIC DETECTION OF PERSISTENT CHANGES IN NATURALLY VARYING SCENES

(75) Inventors: Robert R. Price, Palo Alto, CA (US); Juan Liu, Cupertino, CA (US); Ajay Raghavan, Mountain View, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 99 days.

(21) Appl. No.: 13/617,965

(22) Filed: Sep. 14, 2012

(65) Prior Publication Data
US 2014/0079280 A1 Mar. 20, 2014

(51) Int. Cl.
*G06K 9/00* (2006.01)
*G06K 9/62* (2006.01)

(52) U.S. Cl.
CPC .............. *G06K 9/62* (2013.01); *G06K 9/00771* (2013.01)

(58) Field of Classification Search
None
See application file for complete search history.

(56) References Cited

U.S. PATENT DOCUMENTS

| | | | |
|---|---|---|---|
| 4,774,570 A | 9/1988 | Araki | |
| 5,576,738 A | 11/1996 | Anwil et al. | |
| 6,539,055 B1 | 3/2003 | Hazra | |
| 7,110,452 B2 | 9/2006 | Katsavounidis et al. | |
| 7,139,098 B2* | 11/2006 | Klassen | 358/1.9 |
| 7,606,391 B2 | 10/2009 | Gadre et al. | |
| 7,787,149 B2* | 8/2010 | Ichitani | 358/1.9 |
| 7,791,477 B2 | 9/2010 | Sharma | |
| 7,864,980 B2 | 1/2011 | Evans | |
| 8,159,537 B2* | 4/2012 | Itoh et al. | 348/155 |
| 8,305,440 B2* | 11/2012 | McLeish et al. | 348/143 |
| 8,422,791 B2* | 4/2013 | Liu et al. | 382/199 |
| 2003/0107649 A1* | 6/2003 | Flickner | G06K 9/00362 348/150 |
| 2004/0141633 A1* | 7/2004 | Horie | 382/103 |
| 2007/0122000 A1* | 5/2007 | Venetianer et al. | 382/103 |
| 2007/0269108 A1* | 11/2007 | Steinberg et al. | 382/173 |
| 2008/0174608 A1* | 7/2008 | Mahy et al. | 345/604 |
| 2008/0247599 A1* | 10/2008 | Porikli et al. | 382/103 |
| 2009/0060278 A1* | 3/2009 | Hassan-Shafique et al. | 382/103 |
| 2009/0067716 A1* | 3/2009 | Brown et al. | 382/173 |
| 2012/0069024 A1 | 3/2012 | Saund | |

(Continued)

OTHER PUBLICATIONS

Pan et al. "Robust Abandoned Object Detection using Region-level analysis" IBM, Watson Research Center, 2011.*

*Primary Examiner* — Bhavesh Mehta
*Assistant Examiner* — Oneal R Mistry
(74) *Attorney, Agent, or Firm* — Fay Sharpe LLP

(57) ABSTRACT

A method for detecting a persistent change in a dynamically varying scene includes: obtaining a set of reference images of the scene; transforming the reference images into an abstract feature space; classifying pixels of the reference images in the abstract feature space; generating a stable reduced-reference image based on the classifications of corresponding pixels; obtaining a set of test images of the scene; transforming the test images into the abstract feature space; classifying pixels of the test images in the abstract feature space; generating a stable test image based on the classifications of corresponding pixels; and comparing the stable reduced-reference and test images to one another to detect a difference therein, the difference corresponding to a persistent change in the dynamically varying scene occurring between when the reference images and the test images were obtained.

16 Claims, 5 Drawing Sheets

(56) References Cited

U.S. PATENT DOCUMENTS

| | | |
|---|---|---|
| 2012/0070091 A1 | 3/2012 | Saund |
| 2012/0203721 A1 | 8/2012 | Bart |
| 2013/0051613 A1* | 2/2013 | Bobbitt et al. ............... 382/103 |
| 2013/0108102 A1* | 5/2013 | Brown ............... G06K 9/00369 382/103 |
| 2014/0055609 A1* | 2/2014 | Fan ................... G06K 9/00771 348/143 |

\* cited by examiner

AUTOMATIC DETECTION OF PERSISTENT CHANGES IN NATURALLY VARYING SCENES

BACKGROUND

The present inventive subject matter relates generally to the art of image analysis. Particular but not exclusive relevance is found in connection with the analysis of images captured by red light and/or other traffic enforcement cameras. Accordingly, the present specification makes specific reference thereto. It is to be appreciated however that aspects of the present inventive subject matter are also equally amenable to other like applications.

For images captured with red light, traffic enforcement and/or other like automated and/or unattended cameras it can be desirable to automatically detect a persistent change in the scene observed by the camera. For example, it may be desirable to detect a stalled and/or abandoned vehicle on a roadway or at an intersection or it may be desirable to detect abandoned luggage or packages left suspiciously at an airport or other location. In these examples, the abandoned vehicle or luggage represents a persistent change in the scene. In another example, foliage growth obstructing a view of the camera may represent a persistent change in the scene. Detecting such changes can be particularly challenging in outdoor scenes due to naturally varying illumination, e.g., caused by changes in sun position and/or the weather.

The problem is further complicated when the scene of interest contains relatively inconsequential dynamic variations that are not particularly significant from a detection perspective in the particular application at hand. For example, at a traffic intersection, vehicles may drive through the scene at various times and are part of a dynamically varying "background." Likewise, at an airport, people may be walking through the scene at various times. However, such transient changes and/or variations in the background of the scene may not be of particular interest. Yet, more persistent changes such as a stalled vehicle or abandoned piece of luggage (referred to as "foreground" changes in the scene) may be of interest.

Certain camera monitoring systems and/or techniques have been developed which function to detect transient changes in an observed scene, but the detection of persistent changes in a dynamically varying scene is largely performed by technicians and/or other assigned personnel manually examining images of the scene obtained by the camera. Such manual processes can be undesirably labor intensive and/or prone to human error.

Accordingly, a new and/or improved method, system and/or apparatus for detecting persistent changes in a naturally varying scene observed by a camera is disclosed which addresses the above-referenced problem(s) and/or others.

SUMMARY

This summary is provided to introduce concepts related to the present inventive subject matter. This summary is not intended to identify essential features of the claimed subject matter nor is it intended for use in determining or limiting the scope of the claimed subject matter.

In accordance with one embodiment, a method is provided for automatically detecting a persistent change in a dynamically varying scene observed by a camera. The method includes: obtaining a first set of one or more reference images of the scene; transforming the reference images into an abstract feature space; classifying pixels of the reference images in the abstract feature space into one of a plurality of classifications; generating a stable reduced-reference image based on the classifications of corresponding pixels across the reference images; obtaining a second set of one or more test images of the scene; transforming the test images into the abstract feature space; classifying pixels of the test images in the abstract feature space into one of the plurality of classifications; generating a stable reduced-test image based on the classifications of corresponding pixels across the test images; and comparing the stable reduced reference and test images to one another to detect a difference therein, the difference corresponding to a persistent change in the dynamically varying scene occurring between when the reference images were obtained and when the test images were obtained.

In accordance with other embodiments, an apparatus is provided that executes the foregoing method a non-transitory machine-readable medium is provided including a computer program which when executed performs the foregoing method.

In accordance with another embodiment, a camera system includes: a camera that obtains over time a first set of one or more reference images of a dynamically varying scene and a second set of one or more test images of the scene; and an image processor. The image processor operates to: transform the reference images into an abstract feature space; classify pixels of the reference images in the abstract feature space into one of a plurality of classifications; generate a stable reduced-reference image based on the classifications of corresponding pixels across the reference images; transform the test images into the abstract feature space; classify pixels of the test images in the abstract feature space into one of the plurality of classifications; generate a stable reduced-test image based on the classifications of corresponding pixels across the test images; and compare the stable reduced reference and test images to one another to detect a difference therein, the difference corresponding to a persistent change in the dynamically varying scene occurring between when the reference images were obtained and when the test images were obtained.

Numerous advantages and benefits of the inventive subject matter disclosed herein will become apparent to those of ordinary skill in the art upon reading and understanding the present specification.

BRIEF DESCRIPTION OF THE DRAWING(S)

The following detailed description makes reference to the figures in the accompanying drawings. However, the inventive subject matter disclosed herein may take form in various components and arrangements of components, and in various steps and arrangements of steps. The drawings are only for purposes of illustrating exemplary and/or preferred embodiments and are not to be construed as limiting. Further, it is to be appreciated that the drawings may not be to scale.

DETAILED DESCRIPTION OF THE EMBODIMENT(S)

Figure 1:
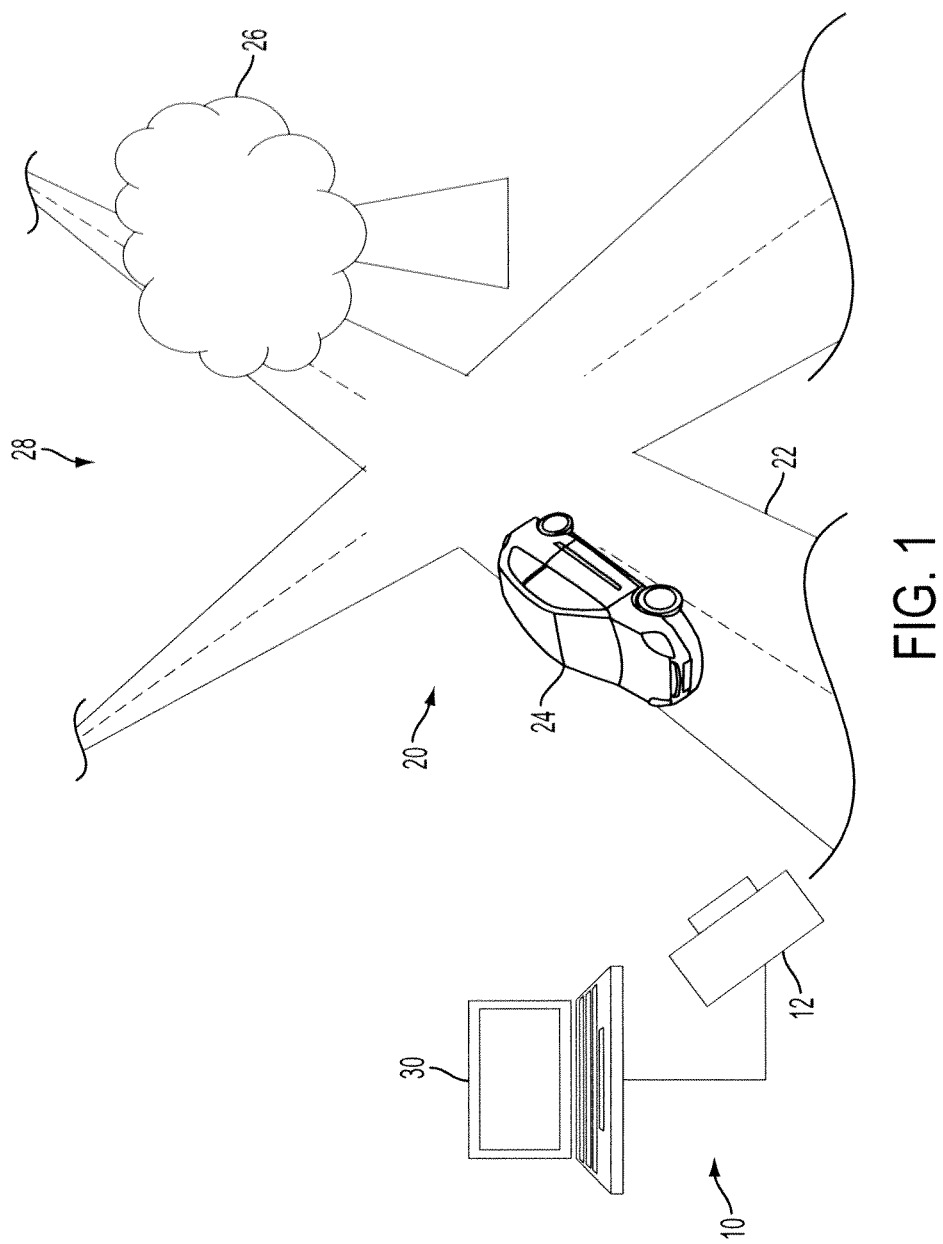
FIG. 1 is a diagrammatic illustration showing an exemplary camera system suitable for practicing aspects of the present inventive subject matter.

For clarity and simplicity, the present specification shall refer to structural and/or functional elements, relevant standards and/or protocols, and other components that are commonly known in the art without further detailed explanation as to their configuration or operation except to the extent they have been modified or altered in accordance with and/or to accommodate the preferred and/or other embodiment(s) presented herein.

The present specification describes generally a method, process, apparatus and/or system for automatically detecting a persistent change in a dynamically varying scene observed by a camera. Generally, a stable reduced-reference image is created from a series of reference images capture by the camera (e.g., during initial camera installation and/or setup) and a stable test image is created from a series of test images captured by the camera (e.g., during later normal operation thereof). Suitably, in each case, the reference images and the test images are first converted or otherwise transformed to an abstract feature space and therefrom the pixels are quantized, grouped and/or clustered into a number of classes. The reference images so abstracted and classified are combined and/or otherwise collectively processed to find, e.g., the most common class of pixel at each corresponding pixel location. The stable reduced-reference image is in turn determined accordingly with each pixel therein being defined by the most common class of pixel found at the corresponding pixel location. Likewise, the test images so abstracted and classified are combined and/or otherwise collectively processed to find, e.g., the most common class of pixel at each corresponding pixel location. The stable test image is in turn determined accordingly with each pixel therein being defined by the most common class of pixel found at the corresponding pixel location. Finally, persistent changes are detected by comparing the stable reduced test image and the stable reduced reference image to one another, e.g., via a suitable background subtraction technique to generate a difference image. By applying suitable thresholding to the difference image, changes of sufficient size and/or intensity are detected. Suitably, such a detection triggers an appropriate alarm or notification.

In one suitable embodiment, the abstract feature space represents image pixels in terms of intensity, hue, texture and location. These features tend to naturally discriminate between object of interest. For example, foliage tends to have predominantly green and brown tones and a richly textured appearance, and is typically found generally around the outside of the image or scene. Conversely, vehicles tend to have lighter colors and smooth textures and they tend to be in the middle of the image or scene.

Suitably, the camera captures images in a Red-Green-Blue (RGB) color space and the abstraction process starts with a conversion of the RGB image from the camera into an Lab color space, where L represents the lightness and a and b represent color-opponent dimensions. The Lab space is advantageous insomuch as unit changes in Lab space correspond to perceptually salient changes in visual stimuli for the human visual system. The Lab space also separates out the image intensity dimension from the hue components. This provides a natural basis to create intensity invariant features that are robust to changes in illumination.

In addition to local intensity and hue features, the abstract feature space also includes a feature that captures the local texture around a pixel. In one suitable embodiment, the local entropy of pixel intensities in each of the three Lab components is employed as a measure of local texture. In one exemplary embodiment, to compute the entropy, a histogram is calculated for the neighboring pixels to get counts of various intensities and then these are normalized to get probabilities. The entropy of this distribution is a measure of uniformity in the neighborhood of the pixel.

Additionally, the coordinates (e.g., the x and y Cartesian coordinates) of a pixel are also incorporated in the abstract feature space, e.g., to associate certain regions with objects and to encourage smoothness of later classification.

The result of the abstraction is a vector V of pixel features associated with each pixel in the image. For example, the vector V may have the form:

$$(x, y, L_{x,y}, a_{x,y}, b_{x,y}, H(L_{x,y}), H(a_{x,y}), H(b_{x,y}))$$

where x and y are the respective Cartesian coordinates defining the location of a pixel for which the vector V is computed and/or otherwise determined, $L_{x,y}$ is the L (or L*) component of the pixel at location x,y in the Lab color space, $a_{x,y}$ is the a (or a*) component of the pixel at location x,y in the Lab color space, $b_{x,y}$ is the b (or b*) component of the pixel at location x,y in the Lab color space, $H(L_{x,y})$ is the local entropy of the L (or L*) component in a neighborhood of the pixel at location x,y, $H(a_{x,y})$ is the local entropy of the a (or a*) component in a neighborhood of the pixel at location x,y, and $H(b_{x,y})$ is the local entropy of the b (or b*) component in a neighborhood of the pixel at location x,y.

The foregoing abstract pixel features capture important properties of the pixels, but can be hard to compare across images. For instance, a tree may have small variations in pixel hue and texture across images, but this may not be significant for the present application. Accordingly, in one suitable embodiment, the pixels features are quantized, grouped and/or clustered into a number of classes that are suitably robust to local changes.

In one embodiment, pixel classification is achieved by representing image or pixel features as a mixture of Gaussian components. The location feature or pixel coordinates is/are particularly useful in the context of pixel clustering. The location parameter also supports generalization of the Gaussian components. Given several images of the same scene from a fixed camera, one would expect a particular pixel to be generated by the same class or type of object. Accordingly, the Gaussian components are therefore oriented to handle variations in lighting across the scenes over different times, days and/or seasons. For example, a pixel classified as foliage suitably represents a range of appearances of the same leaf object; a pixel classified as roadway is suitably broad enough to represent both the road and passing vehicles; etc. The result of the Gaussian mixture segmentation is the classification of pixels in the image into a number of regions corresponding to different types of objects. For example, in a traffic application, pixels may tend to be grouped and/or clustered into classifications representing things like foliage, sky, roads, vehicles, etc.

In practice, a set of one or more training images may be used to generate a pixel class model. In particular, for each training image, the pixel features and/or vector V may be calculated and/or otherwise determined for each pixel in the image. The union of all the vectors V from all the training images may then be calculated and/or otherwise determined, and the Gaussian mixture model is trained based thereon to produce the pixel class model. For example, sufficiently similar or equivalent vectors (i.e., those having sufficiently similar or equivalent pixel features) are grouped together in a clusters based upon the frequency of such similar vectors V appearing in the union of vectors V determined from the training images. Suitably, a number of clusters may thusly be developed for those similar vectors and/or similar sets of pixel features which appear in the union at the highest or relatively high frequencies. Each cluster so developed is then associated with a particular pixel classification. For the detection of persistent changes in a traffic application or setting, it has been found that a Gaussian mixture with five components (i.e., five different clusters and/or pixel classifications) suffices. However, in practice more or fewer classifications may be used.

Suitably, the pixel class model is employed to classify the pixels of the reduced reference and/or test images. In particular, the vector V and/or pixel features of a given pixel is/are calculated and/or otherwise determined. Based thereon, the pixel location in the abstract feature space is determined, and it is determined from this location which cluster of the pixel class model is closest. The classification assigned to the cluster of the pixel class model which is closed to the pixel location in the abstract feature space is then deemed to be and/or assigned as the classification of the given pixel under consideration. Optionally, if a given pixel's location in the abstract feature space is substantially equidistant from two or more clusters of the pixel class model or is sufficiently far away (i.e., greater than some threshold distance) from any cluster in the pixel class model, then the given pixel under consideration may be assigned an "unknown" or "other" or "miscellaneous" classification rather than the particular classification assigned to any cluster in the pixel class model.

With reference now to FIG. 1, an automated and/or unattended camera system 10 includes a camera 12 for selectively capturing and/or obtaining images of a scene 20 within the camera's field-of-view (FoV). Suitably, the camera 12 has a substantially fixed frame on the scene 20. That is to say, the orientation of and/or direction in which the camera 12 is pointed is substantially fixed. In practice, the camera 12 may be a digital camera and may be either a still picture camera or a video camera. When referring herein to a captured or otherwise obtained image from the camera 12, it is intended to mean an image from a picture camera or a still frame from a video camera. Similarly, a sequence or series of one or more images is intended to mean a series of one or more images sequentially obtained by a picture camera over a period of time or a series of one or more still frames sequentially obtained from a video camera over a period of time. In the illustrated example, the scene 20 at which the camera 12 is aimed and/or pointed is a traffic intersection including: a roadway 22; a vehicle 24 on the roadway 22; a tree or foliage 26; and sky 28. Alternately, however, it is to be appreciated that in practice other scenes, e.g., such as an airport, may be the subject of interest. In any event, it is to be appreciated that the scene 20 is generally dynamically varying over time, e.g., due to transient vehicles or people moving through the scene 20, due to changes in illumination cause by movement of the sun position and/or varying weather or other causes, etc.

In the illustrated embodiment, the system 10 further includes a computer 30 or the like that is remotely or otherwise in communication with the camera 12. Suitably, the computer 30 obtains or otherwise receives and analyzes a sequence of one or more images captured by the camera 12 in order to automatically detect a persistent change in the scene 20. For example, the persistent change may be the vehicle 24 which is stalled and/or abandoned on the roadway 22, or the growth of the foliage 26; neither of which may have been present when the camera 12 was initially installed and/or setup. In practice, the images obtained or received and analyzed by the computer 30 are digital images, e.g., captured by a digital camera. Optionally, the computer 30 may receive an analog feed which is in turn digitized to obtain digital images for analysis. In one suitable embodiment, the computer 30 obtains or receives and analyzes essentially all the images captured by the camera 12. Alternately, the computer 30 may obtain or receive and analyze a representative sample or other subset of the images captured by the camera 12 at periodic or intermittent intervals or otherwise chosen times. Suitably, the images may be transmitted from the camera 12 to the computer 30 and/or analyzed in real time or near real time or in batches or otherwise.

Suitably, as mentioned above, the captured images are obtained by the camera 12 in a Red-Green-Blue (RGB) color space. In practice, a first set or series of reference images are obtained by the camera 12, e.g., at or around the time of its initial installation or setup. At some time later, e.g., during otherwise normal operation of the camera system 10, a second set or series of test images are obtained by the camera 12. As discussed herein, the reference images are processed to produce a stable reduced-reference image (with the pixels therein defined by their respective classifications) and the test images are processed to produce a stable test image (with the pixels therein defined by their respective classifications), and then the stable reduced-reference and test images are compared and/or contrasted to one another to detect a persistent change in the scene 20 that arises between when the reference images where obtained and when the test images where obtained. For example, the aforementioned image processing and/or the comparison and/or contrasting of the results may be carried out by the computer 30.

Figure 2:
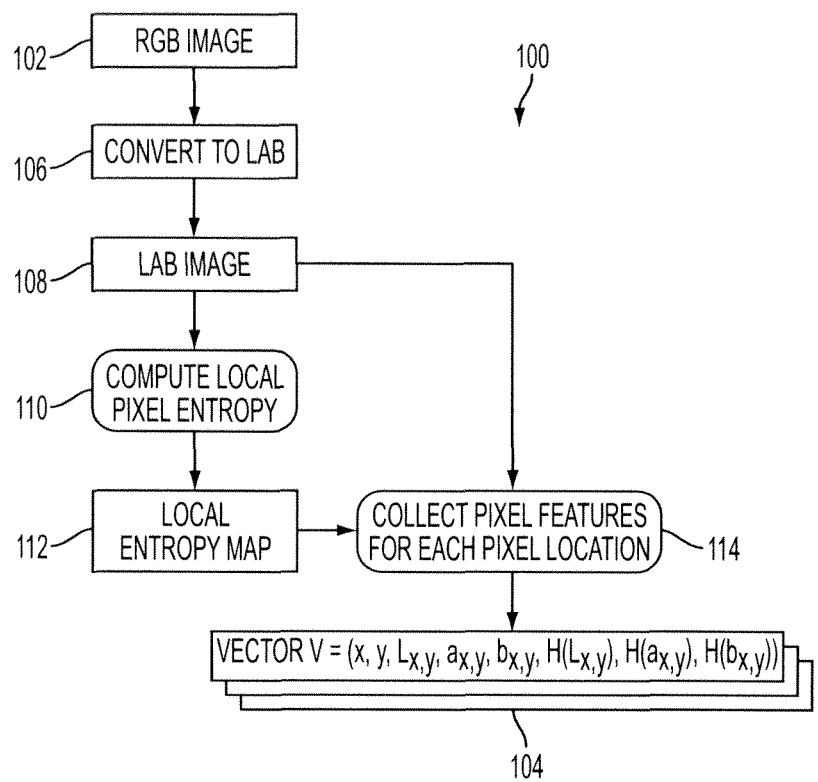
FIG. 2 is a flow chart illustrating an exemplary process for converting and/or transforming images into an abstract feature space in accordance with aspects of the present inventive subject matter.

With reference now to FIG. 2, there is shown an exemplary process 100, e.g., carried out by the computer 30, for converting an input RGB image 102 (be it a reference image or a test image captured by the camera 12 or otherwise) into an abstract feature space. That is to say, the process 100 computes and/or otherwise determines the pixel features and/or vector V for each pixel in the input image 102. More specifically, the output or result of the process 102 is an array of pixel feature sets or vectors V 104, including one set or vector V for each pixel in the input image 102.

As shown, the input image 102 is defined in a RGB color space (i.e., as a RGB image). Suitably, at step 106, the input image 102 is converted and/or transformed to an Lab color space to generate an Lab image 108. At step 110, the local entropy is computed and/or otherwise determined for each pixel in the Lab image, e.g., as described above herein. Suitably, the local entropy is computed and/or otherwise determined for each of the three Lab components. As shown, step 110 produces a local entropy image or map 112.

In the illustrated embodiment, at step 114, the pixel features are collected from the Lab image 108 and the local entropy map 112 for each pixel in the input image 102, along with the corresponding pixel location x,y. For example, $L_{x,y}$, $a_{x,y}$ and $b_{x,y}$ are suitably collected from the Lab image 108, and $H(L_{x,y})$, $H(a_{x,y})$ and $H(b_{x,y})$ are suitably collected from the local entropy map 112. In this way, the pixels features and/or vectors V are computed and/or otherwise determined for all the pixels in the input image 102. The resulting output is suitably an array of pixel feature sets or vectors V 104, including one set or vector V for each pixel in the input image 102.

In practice, the process 100 is optionally used to convert or transform each of the references images and each of the test images into the abstract feature space. From there, the pixels of the reference images and the test images as defined in the abstract feature space are then classified in accordance with a pixel class model, e.g., as described herein.

Figure 3:
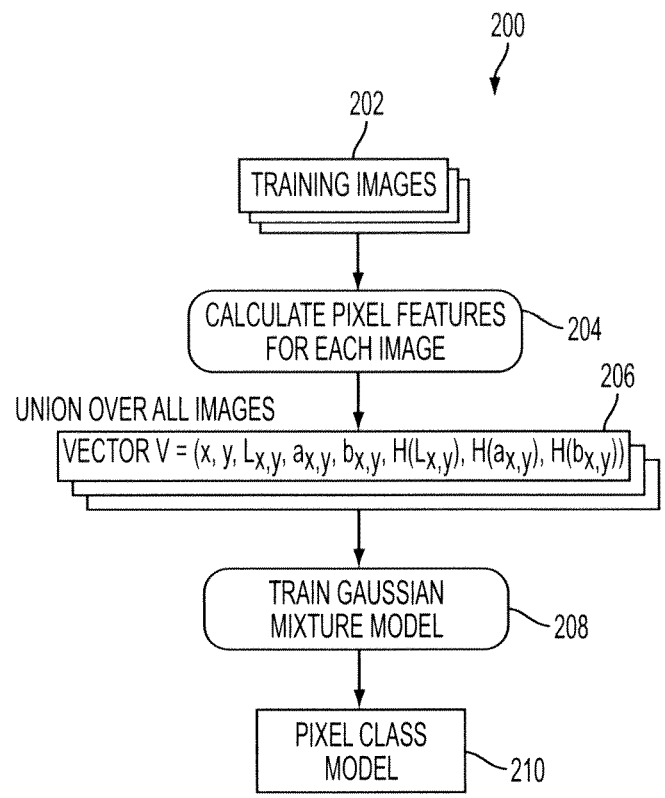
FIG. 3 is a flow chart illustrating an exemplary process for creating a pixel class model from a set of training images in accordance with aspects of the present inventive subject matter.

With reference now to FIG. 3, there is shown an exemplary process 200, e.g., carried out by the computer 30, for generating and/or otherwise determining the pixel class model. In practice, a set of one or more training images 202 is used to generate the pixel class model. For example, the training images may generally depict scenes similar to the scene 20 being observed by the camera system 10 for which the pixel model is being generated. For example, if the scene 20 is a traffic scene, then the training images 202 also suitably depict typical traffic scenes; or if the scene 20 is an airport, then the training images 202 also suitably depict typical airport scenes. Suitably, the training images 202 however may not depict the exact same scene 20 being observed by the camera system 10. In practice, the training images 202 may include images obtained under a variety of different lighting conditions to account for such natural variations as may be experienced by the scene 20, e.g., due to changes in the sun's position and/or weather.

At step 204, the pixel features or vectors V are computed and/or otherwise determined for each pixel in each training image 202. For example, the process 100 may be used for this purpose. The results from all the training images are then combined. That is to say, the union 206 of all the sets of pixel features and/or vectors V is computed or determined over all the training images 202. At step 208, a Gaussian mixture model is trained based on the union of vectors V and/or sets of pixel features 206 to produce or generate the pixel class model 210. For example, sufficiently similar or equivalent vectors (i.e., those having sufficiently similar or equivalent pixel features) are grouped together in a clusters based upon the frequency of such similar vectors V appearing in the union of vectors V determined from the training images 202. Suitably, a number of clusters may thusly be developed for those similar vectors and/or similar sets of pixel features which appear in the union at the highest or relatively high frequencies. Each cluster so developed is then associated with a particular pixel classification. For the detection of persistent changes in a traffic application or setting, it has been found that a Gaussian mixture with five components (i.e., five different clusters and/or pixel classifications) suffices. However, in practice more or fewer classifications may be used.

Figure 4:
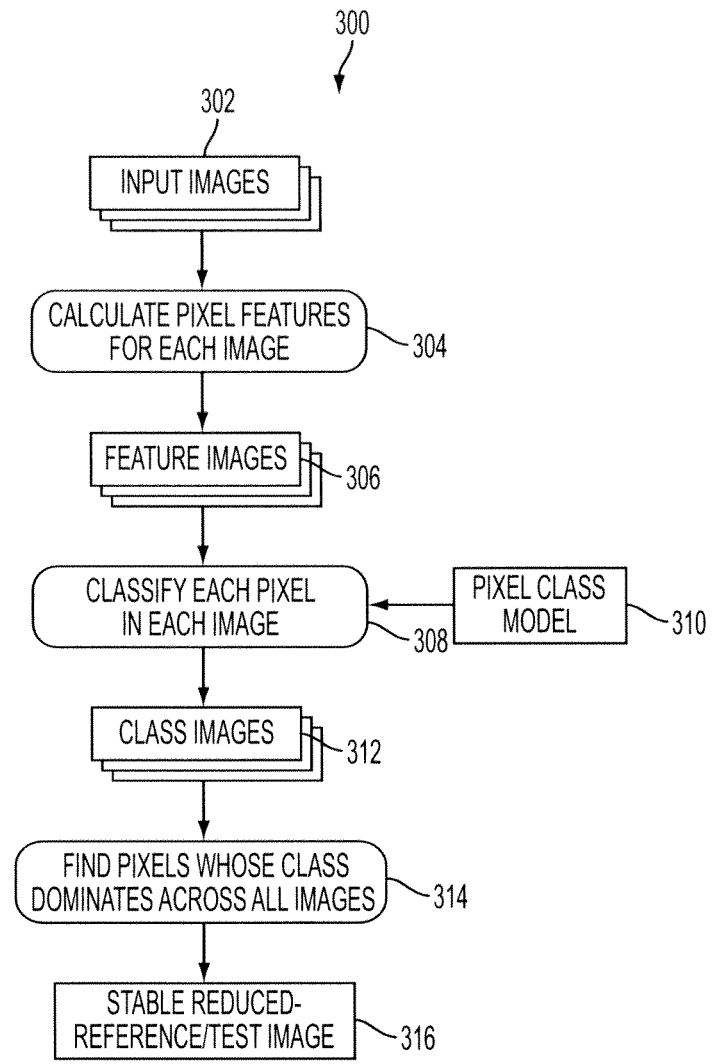
FIG. 4 is a flow chart illustrating an exemplary process for generating a stable reduced reference/test image from a set of reference/test images in accordance with aspect of the present inventive subject matter.

With reference now to FIG. 4, there is shown an exemplary process 300, e.g., carried out by the computer 30, for generating the stable reduced-reference and/or test images. As shown, the process 300 generates either the stable reduced-reference image, when the starting images 302 are the reference images, or the stable reduced-test image, when the starting images 302 are the test images.

In either case, a set or series of starting images 302 (be they test images or reference images) are converted and/or transformed into the abstract feature space at step 304, e.g., using the process 100. Accordingly, a set or series of images defined in the abstract feature space (i.e., feature images 306) are produced where the pixels therein are represented by their respective feature sets or vectors V. At step 308, the pixels in each of the feature images 306 are classified according to the pixel class model 310, e.g., which may be produced according to the process 200. In particular, based on a given pixel's location in the abstract feature space, it is determined which cluster of the pixel class model 310 is closest thereto. The classification assigned to the cluster of the pixel class model 310 which is closed to the pixel location in the abstract feature space is then deemed to be and/or assigned as the classification of the given pixel under consideration. Optionally, if a given pixel's location in the abstract feature space is substantially equidistant from two or more clusters of the pixel class model 310 or is sufficiently far away (i.e., greater than some threshold distance) from any cluster in the pixel class model 310, then the given pixel under consideration may be assigned an "unknown" or "other" or "miscellaneous" classification rather than the particular classification assigned to any cluster in the pixel class model 310.

As shown, the results of the classifying step 308 are a set or series of images (i.e., pixel class images 312) where each pixel in the respective image is defined or represented by the given classification assigned thereto in step 308. In turn, at step 314, the pixel class images 312 are correlated and/or processed together to generate or produce the stable image 316 (be it the stable reduced-test image or the stable reduced-reference image as the case may be depending on the starting images 302). Suitably, a consistency operator (such as the statistical mode or conjunction) is applied across all the pixel class images, e.g., to find the most common class of pixel at any given pixel location. Accordingly, the class of pixel thus found is assigned as the final classification for that pixel location in the resulting stable image 316. In this way, transient changes and/or artifacts (e.g., from moving vehicles passing through the scene 20) are filtered out of and/or suppressed in the resulting stable image 316, while persistent changes (e.g., such as a stalled vehicle 24 and/or foliage growth 26) remain apparent and/or depicted in the stable image 316.

Figure 5:
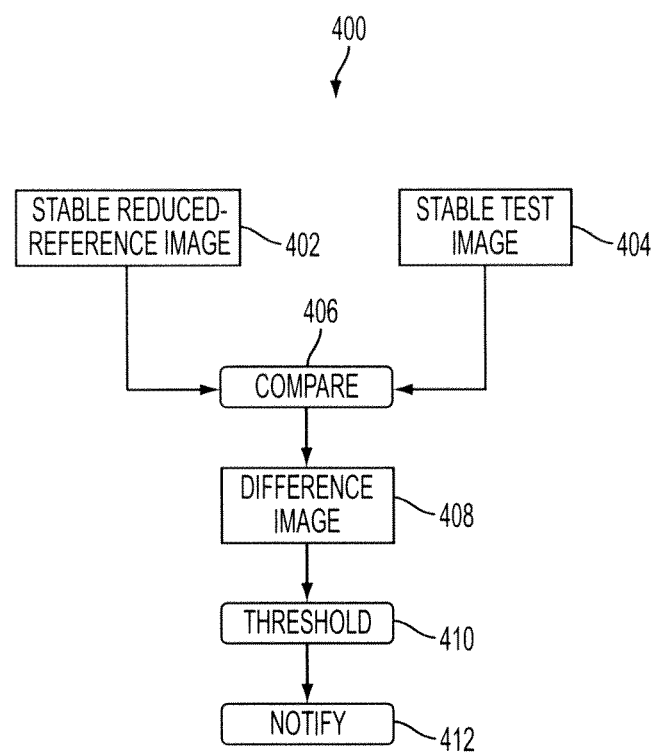
FIG. 5 is a flow chart illustrating an exemplary process for comparing stable reduced reference and test images to one another to detect persistent changes in a dynamically varying scene in accordance with aspect of the present inventive subject matter.

With reference now to FIG. 5, there is shown an exemplary process 400, e.g., carried out by the computer 30, for detecting persistent changes in the dynamically varying scene 20 based on the generated stable reference and test images. As shown, having generated the stable reduced-reference and test images (e.g., as previously described herein), the stable reduced reference and test images 402 and 404 are compared to one another at comparison step 406. For example, using traditional background subtraction method or the like, a difference image 408 may be generated based on the differences between the stable reduced reference image 402 and the stable reduced test image 404. In this manner, persistent changes occurring in the scene 20 between the times the reference images and the test images were obtained by the camera 12 will be suitably highlighted and/or depicted in difference image 408.

In one suitable embodiment, at step 410, appropriate thresholding is applied to the difference image 408. The thresholding is applied to distinguish persistent changes of meaningful significance from relatively insignificant and/or uninteresting changes. For example, the thresholding may optionally distinguish persistent changes depicted in the difference image 408 based on the size and/or intensity of the changes as they appear in the difference image 408. That is to say, differences that are below a threshold size and/or intensity may be ignored as insignificant and/or unmeaningful, while differences which exceed a threshold size and/or intensity may give rise to further action. For example, such further action may include the triggering of an alarm or notification as shown in step 412. Optionally, for example, the computer 30 may provide such a notification by way of a visual indication, audible signal, display or sending of a suitable message, activation of a humanly perceivable alert or alarm, etc.

While described above with respect to specific examples and/or embodiments, it is to be appreciated that various alternative are contemplated. For example, while described above with respect to a fix camera, it is to be appreciated that the described methods, processes, techniques, etc. may be generally applicable to moving or panning camera systems as well. Suitably, for example, the methods, processes, techniques, etc. described herein could simply be applied to create stable reduced-reference and test images at each camera angle or viewpoint of interest.

In any event, the above elements, components, processes, methods, apparatus and/or systems have been described with respect to particular embodiments. It is to be appreciated, however, that certain modifications and/or alteration are also contemplated.

It is to be appreciated that in connection with the particular exemplary embodiment(s) presented herein certain structural and/or function features are described as being incorporated in defined elements and/or components. However, it is contemplated that these features may, to the same or similar benefit, also likewise be incorporated in other elements and/or components where appropriate. It is also to be appreciated that different aspects of the exemplary embodiments may be selectively employed as appropriate to achieve other alternate embodiments suited for desired applications, the other alternate embodiments thereby realizing the respective advantages of the aspects incorporated therein.

It is also to be appreciated that any one or more of the particular tasks, steps, processes, analysis, methods, functions, elements and/or components described herein may suitably be implemented via hardware, software, firmware or a combination thereof. For example, the computer 30 may include a processor, e.g., embodied by a computing or other electronic data processing device, that is configured and/or otherwise provisioned to perform one or more of the tasks, steps, processes, analysis, methods and/or functions described herein. For example, the computer 30 or other electronic data processing device employed in the system 10 may be provided, supplied and/or programmed with a suitable listing of code (e.g., such as source code, interpretive code, object code, directly executable code, and so forth) or other like instructions or software or firmware (e.g., such as an application to perform and/or administer the processing and/or image analysis described herein), such that when run and/or executed by the computer or other electronic data processing device one or more of the tasks, steps, processes, analysis, methods and/or functions described herein are completed or otherwise performed. Suitably, the listing of code or other like instructions or software or firmware is implemented as and/or recorded, stored, contained or included in and/or on a non-transitory computer and/or machine readable storage medium or media so as to be providable to and/or executable by the computer or other electronic data processing device. For example, suitable storage mediums and/or media can include but are not limited to: floppy disks, flexible disks, hard disks, magnetic tape, or any other magnetic storage medium or media, CD-ROM, DVD, optical disks, or any other optical medium or media, a RAM, a ROM, a PROM, an EPROM, a FLASH-EPROM, or other memory or chip or cartridge, or any other tangible medium or media from which a computer or machine or electronic data processing device can read and use. In essence, as used herein, non-transitory computer-readable and/or machine-readable mediums and/or media comprise all computer-readable and/or machine-readable mediums and/or media except for a transitory, propagating signal.

Optionally, any one or more of the particular tasks, steps, processes, analysis, methods, functions, elements and/or components described herein may be implemented on and/or embodiment in one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphical card CPU (GPU), or PAL, or the like. In general, any device, capable of implementing a finite state machine that is in turn capable of implementing the respective tasks, steps, processes, analysis, methods and/or functions described herein can be used.

Additionally, it is to be appreciated that certain elements described herein as incorporated together may under suitable circumstances be stand-alone elements or otherwise divided. Similarly, a plurality of particular functions described as being carried out by one particular element may be carried out by a plurality of distinct elements acting independently to carry out individual functions, or certain individual functions may be split-up and carried out by a plurality of distinct elements acting in concert. Alternately, some elements or components otherwise described and/or shown herein as distinct from one another may be physically or functionally combined where appropriate.

In short, the present specification has been set forth with reference to preferred and/or other embodiments. Obviously, modifications and alterations will occur to others upon reading and understanding the present specification. It is intended that the invention be construed as including all such modifications and alterations insofar as they come within the scope of the appended claims or the equivalents thereof.

What is claimed is:

1. A method of automatically detecting a persistent change in a dynamically varying scene observed by a camera, said method comprising:

obtaining a first set of one or more reference images of the scene;

transforming the reference images into an abstract feature space such that each pixel thereof is transformed so as to be defined by a set of parameters including at least one parameter which represents at least one of a location of the pixel being transformed, an intensity of the pixel being transformed, a hue of the pixel being transformed, a visual appearance of the pixel being transformed, a texture associated with the pixel being transformed or a local entropy in a visual appearance of pixels in a neighborhood of said pixel being transformed;

classifying each pixel of the reference images in the abstract feature space into one of a plurality of classifications, wherein each pixel being classified is classified in response to the parameters defining said pixel being classified;

generating a stable reduced-reference image based on the classifications of corresponding pixels across the reference images;

obtaining a second set of one or more test images of the scene;

transforming the test images into the abstract feature space such that each pixel thereof is transformed so as to be defined by a set of parameters including at least one parameter which represents at least one of a location of the pixel being transformed, an intensity of the pixel being transformed, a hue of the pixel being transformed, a visual appearance of the pixel being transformed, a texture associated with the pixel being transformed or a local entropy in a visual appearance of pixels in a neighborhood of said pixel being transformed;

classifying each pixel of the test images in the abstract feature space into one of the plurality of classifications, wherein each pixel being classified is classified in response to the parameters defining said pixel being classified;

generating a stable test image based on the classifications of corresponding pixels across the test images; and comparing the stable reduced-reference and test images to one another to detect a difference therein, said difference corresponding to a persistent change in the dynamically varying scene occurring between when the reference images were obtained and when the test images were obtained;

wherein the parameters in each set of parameters include: a pair of coordinates which represent the location of the given pixel to which the pair of coordinates relate, an L component of the given pixel to which the L component relates in the Lab color space which represents the intensity of the given pixel to which the L component relates, a and b components of the given pixel to which the a and b components relate in the Lab color space which represent the hue of the given pixel to which the a and b components relate, and a local entropy of the L, a and b components of pixels in a neighborhood of the given pixel to which the local entropy relates which represents the texture associated with the given pixel to which the local entropy relates.

2. The method of claim 1, wherein said reference images and said test images are obtained in a Red-Green-Blue (RGB) color space.

3. The method of claim 2, wherein transforming said reference and test images comprises converting said reference and test image from the RGB color space to an Lab color space.

4. The method of claim 1, wherein said classifying pixels of the reference and test images in the abstract feature space is executed with respect to a pixel class model.

5. The method of claim 4, further comprising generating said pixel class model from a set of one or more training images by grouping pixels from the training images into one or more clusters of pixels having like parameters and designating a classification for said clusters.

6. The method of claim 5, wherein said classifying pixels of the reference and test images comprises determining which cluster of the pixel class model is closest to a location of a given pixel in the abstract feature space and assigning the designated classification of the cluster to the given pixel.

7. The method of claim 1, further comprising determining if the detected difference satisfies a threshold condition, and if the threshold condition is satisfied then triggering a notification.

8. A computer apparatus that executes the method of claim 1.

9. A non-transitory machine-readable medium including a computer program which when executed performs the method of claim 1.

10. A camera system comprising:

a camera that obtains over time a first set of one or more reference images of a dynamically varying scene and a second set of one or more test images of the scene; and an image processor that:

transforms the reference images into an abstract feature space such that each pixel thereof is transformed so as to be defined by a set of parameters including at least one parameter which represents at least one of a location of the pixel being transformed, an intensity of the pixel being transformed, a hue of the pixel being transformed, a visual appearance of the pixel being transformed, a texture associated with the pixel being transformed or a local entropy in a visual appearance of pixels in a neighborhood of said pixel being transformed;

classifies each pixel of the reference images in the abstract feature space into one of a plurality of classifications, wherein each pixel being classified is classified in response to the parameters defining said pixel being classified;

generates a stable reduced-reference image based on the classifications of corresponding pixels across the reference images;

transforms the test images into the abstract feature space such that each pixel thereof is transformed so as to be defined by a set of parameters including at least one parameter which represents at least one of a location of the pixel being transformed, an intensity of the pixel being transformed, a hue of the pixel being transformed, a visual appearance of the pixel being transformed, a texture associated with the pixel being transformed or a local entropy in a visual appearance of pixels in a neighborhood of said pixel being transformed;

classifies each pixel of the test images in the abstract feature space into one of the plurality of classifications, wherein each pixel being classified is classified in response to the parameters defining said pixel being classified;

generates a stable test image based on the classifications of corresponding pixels across the test images; and compares the stable reduced-reference and test images to one another to detect a difference therein, said difference corresponding to a persistent change in the dynamically varying scene occurring between when the reference images were obtained and when the test images were obtained;

wherein the parameters in each set of parameters include: a pair of coordinates which represent the location of the given pixel to which the pair of coordinates relate, an L component of the given pixel to which the L component relates in the Lab color space which represents the intensity of the given pixel to which the L component relates, a and b components of the given pixel to which the a and b components relate in the Lab color space which represent the hue of the given pixel to which the a and b components relate, and a local entropy of the L, a and b components of pixels in a neighborhood of the given pixel to which the local entropy relates which represents the texture associated with the given pixel to which the local entropy relates.

11. The camera system of claim 10, wherein said reference images and said test images are obtained in a Red-Green-Blue (RGB) color space.

12. The camera system of claim 11, wherein transforming said reference and test images comprises converting said reference and test image from the RGB color space to an Lab color space.

13. The camera system of claim 10, wherein said classifying pixels of the reference and test images in the abstract feature space is executed with respect to a pixel class model.

14. The camera system of claim 13, wherein the image processor further generates said pixel class model from a set of one or more training images by grouping pixels from the training images into one or more clusters of pixels having like parameters and designating a classification for said clusters.

15. The camera system of claim 14, wherein said classifying pixels of the reference and test images comprises determining which cluster of the pixel class model is closest to a location of a given pixel in the abstract feature space and assigning the designated classification of the cluster to the given pixel.

16. The camera system of claim 10, wherein the image processor further determines if the detected difference satisfies a threshold condition, and if the threshold condition is satisfied then triggers a notification.

\* \* \* \* \*